United States Patent [19]

Mashita et al.

[11] Patent Number: 4,740,558
[45] Date of Patent: Apr. 26, 1988

[54] THERMOPLASTIC RESIN COMPOSITION

[75] Inventors: Kentaro Mashita, Ichihara; Taichi Nishio, Chiba; Takashi Sanada; Jinsho Nambu, both of Ichihara, all of Japan

[73] Assignee: Sumitomo Chemical Company, Limited, Osaka, Japan

[21] Appl. No.: 940,610

[22] Filed: Dec. 11, 1986

[30] Foreign Application Priority Data

Dec. 12, 1985 [JP] Japan ................. 60-279917

[51] Int. Cl.$^4$ .............................................. C08L 71/04
[52] U.S. Cl. ..................................... 525/143; 525/56; 525/132; 525/142; 525/144; 525/150; 525/151; 525/397
[58] Field of Search .............. 525/132, 68, 905, 143, 525/133

[56] References Cited

U.S. PATENT DOCUMENTS

| | | | |
|---|---|---|---|
| 3,383,435 | 5/1968 | Cizek | 525/905 |
| 4,128,602 | 12/1978 | Katchman et al. | |
| 4,128,603 | 12/1978 | Katchman et al. | |
| 4,128,604 | 12/1978 | Katchman et al. | |
| 4,405,753 | 9/1983 | Deets et al. | 525/905 |
| 4,454,284 | 6/1984 | Ueno et al. | |

FOREIGN PATENT DOCUMENTS

| | | |
|---|---|---|
| 0090523 | 10/1983 | European Pat. Off. |
| 0099062 | 1/1984 | European Pat. Off. |
| 2119371 | 11/1971 | Fed. Rep. of Germany. |
| 3246443 | 6/1983 | Fed. Rep. of Germany. |
| 47-41105 | 10/1972 | Japan. |
| 48-12197 | 4/1973 | Japan. |
| 49-5623 | 2/1974 | Japan. |
| 52-30991 | 3/1977 | Japan. |
| 52-142799 | 11/1977 | Japan. |
| 58-5356 | 1/1983 | Japan. |
| 58-17142 | 2/1983 | Japan. |

*Primary Examiner*—Jacob Ziegler
*Attorney, Agent, or Firm*—Cushman, Darby & Cushman

[57] ABSTRACT

A thermoplastic resin composition containing polyphenylene oxide resin is provided, which is superior in processability and impact resistance as well as heat resistance, chemical resistance and hardness, said thermoplastic resin composition comprising
(A) polyphenylene oxide resin or a resin composition containing the same, and
(B) ethylene copolymer comprising 50–90% by weight of ethylene, 5–49% by weight of alkyl ester of $\alpha,\beta$-unsaturated carboxylic acid and 0.5–10% by weight of maleic anhydride.

3 Claims, No Drawings

THERMOPLASTIC RESIN COMPOSITION

The present invention relates to a novel thermoplastic resin composition usable as shaped articles by injection molding, extrusion molding and the like.

More particularly, the present invention relates to a novel thermoplastic resin composition which is excellent in balance among physical properties and in appearance, wherein ethylene copolymer of ethylene-alkyl ester of $\alpha,\beta$-unsaturated carboxylic acid-maleic anhydride is incorporated in polyphenylene oxide resin or a resin composition containing the same.

Polyphenylene oxide resin is, generally speaking, thermoplastic resin excellent in various properties such as mechanical properties, electrical properties, chemical resistance, heat resistance, water resistance, flame resistance and dimensional stability. However, the resin has difficulties, i.e., melt viscosity is so high that processability is not good, and furthermore, impact strength is relatively small.

One of approaches known to reduce melt viscosity in order to improve processability, without giving any unfavorable influence to excellent properties of polyphenylene oxide resin, is blending polyphenylene oxide resin with polystyrene resin, but this approach tends to lose heat resistance, flame resistance, chemical resistance and other favorable properties of polyphenylene oxide resin, although there is some improvement in practical processability. An improvement in impact strength is not enough even after polyphenylene oxide resin is blended with polystyrene resin.

Another approach is to use polystyrene resin which is modified with butadiene rubber or EPDM rubber or to use styrenic thermoplastic elastomer in order to improve impact strength. However, this approach is not satisfactory yet from a view point of shaping, since although chemical resistance is improved, too, increase in melt viscosity is so large that shaping processability and appearance of shaped articles are greatly damaged.

Further approach to reduce melt viscosity of a polyphenylene oxide composition and to improve melt flowability as well as processability is blending the composition with foreign high molecular resin. However, this approach is not satisfactory, either, since compatibility of the foreign high molecular resin is usually so small that unfavorable difficulties are encountered, i.e., easy peeling off of resin when molded, impairment in appearance of molded articles and great reduction in mechanical properties.

Under the situation above, it is important to select high molecular resin which does not give any of such unfavorable influences as above to a polyphenylene oxide resin composition when blended therein. Development in such resin has long been desired.

The present invention intends to improve processability and impact resistance which are difficulties encountered in polyphenylene oxide resin by adding thereto ethylene copolymer having specific structure, thereby to solve the problem without impairing any of inherent favorable properties such as heat resistance, hardness, etc. It is an object of the present invention to provide a thermoplastic resin composition containing polyphenylene oxide resin, which is superior in processability and impact resistance as well as heat resistance, chemical resistance and hardness.

After having widely and elaborately investigated high molecular resin which facilitates modification of polyphenylene oxide from a viewpoint above, the present inventors have succeeded in finding ethylene copolymer which has specific structure and is able to give a good balance among impact resistance, heat resistance and hardness, and superiorities in processability and in appearance of molded articles. The present invention is based on this finding.

That is, the present invention relates to a thermoplastic resin composition which comprises
(A) polyphenylene oxide resin or a resin composition containing the same, and
(B) ethylene copolymer comprising 50–90% by weight of ethylene, 5–49% by weight of alkyl ester of $\alpha,\beta$-unsaturated carboxylic acid and 0.5–10% by weight of maleic anhydride.

Polyphenylene oxide resin (A) in the present invention is polymer obtained by oxidation polymerizing one or two or more of phenol compound of the formula:

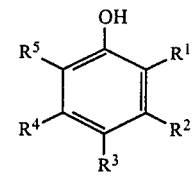

wherein $R^1$, $R^2$, $R^3$, $R^4$ and $R^5$ are respectively selected from a hydrogen atom, a halogen atom, a hydrocarbon group and a substituted hydrocarbon group and at least one of the symbols is a hydrogen atom, with molecular-oxygen or a gas containing the same in the presence of an oxidation polycondensation catalyst.

Examples of $R^1$, $R^2$, $R^3$, $R^4$ and $R^5$ in the formula above are a hydrogen atom, a chlorine atom, a bromine atom, a fluorine atom, an iodine atom, a methyl group, an ethyl group, an n- or iso-propyl group, a prim-, sec- or t-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group and an allyl group.

Examples of the compound of the formula above are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol and 2-methyl-6-allyphenol. Furthermore, the compound of the formula above may be copolymerizied with the other phenols than that of the above formula, e.g., polyvalent hydroxy aromatic compound, as of bis-phenol A, tetrabromobisphenol A, resorcinol, hydroquinone and novolak resin.

Preferable polymers are homopolymer of 2,6-dimethylphenol or of 2,6-diphenylphenol and copolymer of a large amount of 2,6-xylenol and a small amount of 3-methyl-6-t-butylphenol or 2,3,6-trimethylphenol.

Any oxidation polycondensation catalyst for oxidation polymerization of phenol compound may be employed as long as it has polymerization ability. For instance, mention may be made of a catalyst of cuprous salts and tertiary amines such as cuprous chloride-triethylamine and cuprous chloride-pyridine; a catalyst of cupric salts-amino-alkali metal hydroxides such as cupric chloride-pyridine-potassium hydroxide; a catalyst of manganese salts and primary amines such as manganese chloride-ethanolamine and manganese acetateethylenediamine; a catalyst of manganese salts and alcoholates or phenolates such as manganese chloride-sodium methylate and manganese chloride-sodium phenolate; a combination catalyst of cobalt salts and tertiary amines.

Furthermore, polyphenylene oxide resin in the present invention includes polyphenylene oxide above grafted with styrene polymer or other polymers. The resin is prepared by organic peroxide graft polymerization of styrene monomer and/or other polymerizable monomer in the presence of polyphenylene oxide (Japanese published examined patent application Nos. 47862/1972, 12197/1973, 5623/1974, 38596/1977, 30991/1977 etc.) or melt kneading the polyphenylene oxide, polystyrene and a radical initiator (Japanese published unexamined patent application No. 142799/1977).

A resin composition (A) containing polyphenylene oxide in the present invention is that consisting of the polyphenylene oxide and one or more of the other high molecular compound. The high molecular compound includes polyolefin such as polyethylene, polypropylene, ethylene-propylene block copolymer, polymethylpentene, ethylene-α-olefin copolymer; homopolymer or copolymer such as polyvinyl chloride, polymethylmethacrylate, polyvinyl acetate, polyvinyl pyridine, polyvinyl carbazole, polyacrylamide, polyacrylonitrile, ethylene-vinyl acetate copolymer and alkenyl aromatic resin; polycarbonate; polysulfone; polyethylene terephthalate; polybutylene terephthalate; polyallylene ester (for example, "U-polymer" manufactured by Yunichika K.K.); polyphenylene sulfide; polyamide such as 6-nylon, 6,6-nylon and 12-nylon; condensed high molecular compound such as polyacetal; and rubbery polymer. Furthermore, mention may be made of various thermosetting resin such as silicone resin, fluorine resin, polyimido, polyamidoimido, phenol resin, alkyl resin, unsaturated polyester resin, epoxy resin and "Dapon" resin. Mixing ratio of polyphenylene oxide and other high molecular compounds may widely be selected within the range of, for example, 1-99% by weight of polyphenylene oxide and 99-1% by weight of the other high molecular compounds. Optimum ratio depends on object and use of the mixture within the range.

It is easy for the skilled in the art to decide the optimum ratio.

Preferable other high molecular compound is polyolefin, polyamide, alkenyl aromatic resin, rubber modified alkenyl aromatic resin and rubbery polymer.

The most preferable high molecular compound is alkenyl aromatic resin, rubber modified alkenyl aromatic resin and rubbery polymer.

Alkenyl aromatic resin in the present invention is selected from that having at least 25% by weight of polymer unit derived from monomer of the formula:

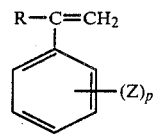

wherein R is a hydrogen atom, a lower alkyl group such as $C_{1-4}$ alkyl group, or a halogen atom; Z is a hydrogen atom, a vinyl group, a halogen atom, a hydroxyl group or a lower alkyl group; and p is zero or an integer of 1-5.

Examples of the alkenyl aromatic resin are homopolymer such as polystyrene, polychlorostyrene and poly-α-methylstyrene, copolymer of such polymer and styrene-containing copolymer such as styrene-acrylonitrile copolymer, styrene-divinylbenzene copolymer and styrene-acrylonitrile-α-methylstyrene copolymer. Preferable ones are homopolystyrene, styrene-α-methylstyrene copolymer, styrene-acrylonitrile copolymer, styrene-α-chlorostyrene copolymer and styrene-methylmethacrylate copolymer. The most preferable one is homopolystyrene.

Rubber modified alkenyl aromatic resin in the present invention is two phase one in which rubber particles are dispersed in alkenyl aromatic resin matrix. Method preparing thereof is mechanical mixing of rubber and alkenyl aromatic resin disclosed hereinafter, or one in which rubber is dissolved in alkenyl aromatic monomer and then the alkenyl aromatic resin is polymerized. The latter method is commercially carried out for preparing high impact polystyrene.

The rubber modified alkenyl resin in the present invention further includes a mixture of polystyrene obtained by the latter method above and rubber and/or alkenyl aromatic resin.

Rubber and rubbery polymer in the present invention means natural or artificial polymer which is elastic at room temperature, for example, 20°-25° C. Examples are natural rubber; diene rubber, for instance, polybutadiene, polyisoprene and polychloroprene; copolymer of diene and vinyl monomer, for instance, styrene-butadiene random copolymer, styrene-butadiene block copolymer, styrene-butadiene-styrene block copolymer, styrene grafted polybutadiene, butadiene-acrylonitrile copolymer; polyisobutylene, isobutylene-butadiene or -isoprene copolymer, ethylene-propylene copolymer, ethylene-propylene-diene copolymer, "Thiokol" rubber, polysulfide rubber, acrylic rubber, polyurethane rubber, polyether rubber, and epichlorohydrin rubber. Furthermore, it includes various modified ones of the rubber mentioned above, for example, hydroxy or carboxy terminal terminated polybutadiene, partially hydrogenated styrene-butadiene-styrene block copolymer. Diene rubber and diene-vinyl compound copolymer in which micro-structure in double bond is varied, i.e., vinyl group, cis-1,4-bonding and trans 1,4-bonding are also employed as rubber or rubbery polymer in the present invention.

Preferable rubber and rubbery polymer is copolymer of butadiene (40–100 parts by weight) and styrene (60–0 part by weight), copolymer of butadiene (65–82 parts by weight) and acrylonitrile (35–18 parts by weight), styrene-butadiene or styrene-butadiene-styrene block copolymer including linear block copolymer, radial block copolymer and other similar block copolymer, styrene-grafted polybutadiene prepared by adding styrene to polybutadiene latex or butadiene-styrene copolymer latex and emulsion polymerizing in the presence of a radical initiator, ethylene-propylene copolymer and ethylene-propylene-diene copolymer.

Polyphenylene oxide and alkenyl aromatic resin and/or rubber modified alkenyl aromatic resin may be mixed with any ratios. Polyphenylene oxide is preferably 5% by weight or more, more preferably 20% by weight or more. Polyphenylene oxide and rubbery polymer may be mixed with any ratios, too, but polyphenylene oxide is about 50% by weight or more, preferably 70% by weight or more, when it is used as plastics.

(B) ethylene copolmer moiety in the present invention is one in which monomers are ethylene, alkyl ester of α,β-unsaturated carboxylic acid and maleic anhydride and ethylene is 50-90% by weight, preferably 60-85% by weight, alkyl ester of α,β-unsaturated carboxylic acid is 5-49% by weight, preferably 7-45% by weight and maleic anhydride is 0.5-10% by weight, preferably 1-8% by weight.

Alkyl ester of α,β-unsaturated carboxylic acid is alkyl ester of $C_{3-8}$ unsaturated carboxylic acid, such as acrylic acid and methacrylic acid. Examples are methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate and isobutyl methacrylate, prefeably ethyl acrylate, n-butyl acrylate and methyl methacrylate.

There is no limitation on mixing ratio of (A) and (B) components in the present invention and the ratio is decided depending on objects therefor. (B) component, for example, is changeable within the range of 0.5-99.5% by weight.

Preferable mixing ratio depending on objects of a composition is that, for example, a composition comprising (A) polyphenylene oxide resin or polyphenylene oxide/alkenyl aromatic resin and (B) ethylene/alkyl ester of α,β-unsaturated carboxylic acid/maleic anhydride copolymer, should contain preferably 3-30% by weight, more preferably 5-20% by weight of (B) component, when the composition is employed as high impact engineering plastic.

The composition above has unexpectedly high impact resistance and there is no decrease in the impact resistance even when it is molded at high temperature.

A composition comprising (A) polyphenylene oxide resin, alkenyl aromatic resin and rubbery polymer and (B) ethylene/alkyl ester of α,β-unsaturated carboxylic acid/maleic anhydride should contain 0.5-20% by weight, preferably 1-10% by weight of (B) component, although the amount is variable depending on an amount of rubbery polymer in (A) component, when the composition is employed as high impact engineering plastic. There is a remarkable improvement in impact resistance even if an amount of (B) component in the above composition is small.

A composition comprising (A) polyphenylene oxide resin, or polypheylene oxide/alkenyl aromatic resin or polyphenylene oxide/alkenyl aromatic resin/rubbery polymer and (B) ethylene copolymer of ethylene/alkyl ester of α,β-unsaturated carboxylic acid/maleic anhydride and inorganic fillers such as glass fiber, calcium carbonate, silica, zinc oxide and $TiO_2$, should contain 1-40% by weight, preferably 5-30% by weight of (B) component on the basis of the total of (A) and (B) components. Mechanical properties such as impact resistance are lowered when no (B) component is contained in the composition, but the presence of (B) component dissolves this problem.

The examples mentioned above are only a few examples of desirable embodiment of the present invention and are able to change widely depending on objects and uses of the compositions.

Furthermore, the (B) component copolymer in the present invention may include other vinyl comonomer. Examples of such vinyl comonomer are styrene, vinyl acetate, vinyl chloride, α-methylstyrene, divinylbenzene, tetrafluoroethylene, difluoroethylene, vinylidene chloride, acrylonitrile and acrylic amide.

Any process is employed to prepare the present compositon. A usual process known is adopted. A process preferably from an economical point of view is dry blending the components in a mixer such as a Henschel mixer and then melt-kneading and extruding the mixture.

There are no critical limitations to temperature and period of time when melt-kneading is carried out. Temperature is usually within the range of 150°-350 ° C., which varies depending on composition ratio. Any process for melt-kneading is effected as long as it is able to treat viscous melt, no matter whether it is batchwise or continuous. Apparatuses therefor are a Banbury mixer, a roll, an extruder and a kneader.

It is possible to add reinforcing materials such as glass fibers, carbon fibers, an inorganic and organic fillers such as carbon black, silica and $TiO_2$, plasticizers, stabilizers, fire retardants, dyes and pigments, when the present invention is practiced. Detail is given in reinforcing materials. They facilitate flexural strength, bending elasticity, tensile strength, tension elasticity and heat deformation temperature, and include alumina fibers, carbon fibers, glass fibers, high elastic polyamide fibers, high elastic polyester fibers, silicon carbide fibers and whisker titanate.

An enough amount of reinforcing material is, at least, to facilitate reinforcement, but usually is within the range of about 5-100 parts by weight each 100 parts by weight of the present composition.

Preferably reinforcing material is glass, more preferably glass fiber filaments made from borosilicate glass of lime containing relatively small amount of sodium content/aluminum. This is known as "E" glass. However, other glasses, for example one having low sodium content, which is known as "C" glass, may be used, when electrical properties are not made so much. Filaments are prepared in a usual manner such as steam or air-blowing, fire-blowing or mechanical stretching. Preferable filament for reinforcing plastics is prepared by mechanical stretching. Filament is within about 2-20 μm in diameter, but thickness is not critical in the present invention. Length of filament is not critical, either.

Furthermore, it is not critical whether glass filaments are bundled into an assembly and then the assemble is further bundled to the form of thread, a rope or lobing or they are woven to a mat. However, glass filament is preferably in the shape of a strand cut shortly to about 0.3-3 cm long, more preferably not longer than about 0.6 cm long, when the present composition is prepared using the same.

Some discussion is made to a fire retardant. A material useful of the present invention includes a group of compounds familiar to the artisans.

Generally speaking, preferable compounds are those containing such elements as bromine, chlorine, antimony, phosphorus and nitrogen which give flame resistance. For instance, mention may be made of halogenated organic compounds, antimony oxide, antimony oxide/halogenated organic compounds, antimony oxide/phosphorus compounds, phosphorus alone or phosphorus compounds, phosphorus compounds or compounds having phosphorus-nitrogen bonding/halogen-containing compounds or a mixture of the above.

An amount of a fire retardant is not critical but that which is able to give flame resistance is enough. To much amount is not desirable because physical properties are degraded, such as lowering in softening point. It is easy for artisan to decide a proper amount thereof. Flame retardant is usually added in such an amount of 0.5–50 parts by weight, preferably 1–25 parts by weight, more preferably 3–15 parts by weight each 100 parts by weight of a mixture of polyphenylene oxide resin and rubber modified alkenyl aromatic resin.

One of useful halogen-containing compounds is

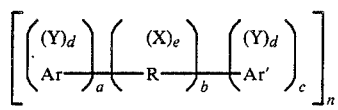

wherein n is 1–10; R is selected from a group of an alkylene group, an alkylidene group or an alicyclic bond group such as methylene, ethylene, propylene, isopropylene, isopropyridene, butylene, isobutylene, amylene, cyclohexylene or cyclopentyridene, an ether group, a carbonyl group, an amine group, a sulfur-containing bond group such as sulfide, sulfoxide or sulfone, a carbonate group or a phosphorus-containing group.

R may be a group having two or more alkylene or alkylidene bonds bound by such groups as aromatic, amino, ether, ester, carbonyl, sulfide, sulfoxide, sulfone or a phosphorus-containing group.

Ar and Ar' are monocyclic or polycyclic carbon cyclic aromatic group, such as phenylene, biphenylene, terphenylene, naphthylene, etc.

Ar and Ar' may be same or different.

Y is a substituent selected from organic, inorganic or organometallic group. Substituent represented by Y is (1) a halogen, such as chlorine, bromine, iodine or fluorine; (2) an ether group of the formula OE wherein E is the similar monovalent hydrocarbon group to X defined below; (3) an -OH group; (4) a monovalent hydrocarbon group represented by R or (5) other substituent, such as a nitro group or a cyano group. Y may be same or different when d is 2 or more.

X is a monovalent hydrocarbon group including an alkyl group such as methyl, ethyl, propyl, isopropyl, butyl or decyl; an aryl group such as phenyl, naphthyl, biphenyl, xylyl or toryl; an aralkyl group such as benzyl or ethylphenyl, a cyclo aliphatic group such as cyclopentyl or cyclohexyl; or a monovalent hydrocarbon group containing unfunctional substituents. X may be same or different when 2 or more Xs are used.

d is an integer from one to the maximum which is equal to the maximum number of substitutable hydrogen atoms on aromatic ring of Ar or Ar'. e is from zero to an integer up to the maximum which depends on number of substitutable hydrogen atoms on R.

a, b and c are integers including zero. Neither a nor c is zero when b is not zero. Unless otherwise, either a or c may be zero. Aromatic groups bond each other directly by C—C bond when b is zero. Hydroxyl group or substituent Y may position at any of o-, m- or p- on the aromatic rings Ar and Ar'.

Examples of the compounds having the formula above are 2,2-bis(3,5-dichlorophenyl)-propane, bis(2-chlorophenyl)methane, 1,2-bis(2,6-dichlorophenyl)-ethane, 1,1-bis(4-iodophenyl)-ethane, 1,1-bis(2-chloro-4-iodophenyl)-ethane, 1,1-bis(2-chloro-4-methylphenyl)-ethane, 1,1-bis(3,5-dichlorophenyl)-ethane, 2,2-bis(3-phenyl-4-bromophenyl)-ethane, 2,3-bis(4,6-dichloronaphthyl)-propane, 2,2-bis(2,6-dichlorophenyl)-pentane, 2,2-bis(3,5-dichlorophenyl)-hexane, bis(4-chlorophenyl)-phenylmethane, bis(3,5-dichlorophenyl)-cyclo-hexylmethane, bis(3-nitro-4-bromophenyl)-methane, bis(4-oxy-2,6-dichloro-3-methoxyphenyl)-methane, 2,2-bis(3,5-dibromo-4-oxyphenyl)-propane, 2,2-bis(3,5-dichloro-4-oxyphenyl)-propane, 2,2-bis(3-bromo-4-oxyphenyl)-propane; such bisaromatic compounds as those wherein sulfide or sulfoxy group is used in place of the two aliphatic groups in the compounds listed above; tetrabromobenzene, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl, halogenated diphenylether having 2–10 halogen atoms and oligomer having 1–20 of polymerization degree of polycondensate between 2,2-bis(3, 5-dibromo-4-oxyphenyl)-propane and phosgene.

Preferable halogen compounds in the present invention are aromatic halogen compounds such as chlorinated benzene, brominated benzene, chlorinated biphenyl, chlorinated terphenyl, brominated biphenyl and brominated terphenyl; compound containing two phenyl groups apart by a bivalent alkylene group and having at least two chlorine or bromine atoms per phenyl group or a mixutre of at least two of the compounds above. More preferable are hexabromobenzene; and chlorinated-biphenyl or -terphenyl with or without antimony oxide.

Preferable phsophorus compound usable in the present invention has the following formula:

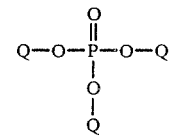

and analogous nitrogen compound. In the formula above, Q is same or different and is selected from a hydrocarbon group of alkyl, cycloalkyl, aryl, alkyl-substituted aryl and aryl-substituted alkyl; a halogen atom, a hydrogen atom and a combination thereof. Preferable ester of phosphoric acid is phenylbisdodecyl phosphate, phenyl-bis-neopentyl phosphate, phenylethylene hydrogenphosphate, phenyl-bis(3,5,5'-trimethylhexyl)phsophate, ethyldiphenyl phosphate, 2-ethylhexyl-di(p-tolyl)phosphate, diphenyl hydrogenphosphate, bis(2-ethylhexyl)-p-tolyl phosphate, tritolyl phosphate, bis(2-ethylhexyl) phenyl phosphate, tri(nonylphenyl)phosphate, phenylmethyl hydrogenphosphate, di(dodecyl)-p-tolyl phosphate, triphenyl phosphate, halogenated triphenyl phosphate, dibutylphenyl phosphate, 2-choroethyldiphenyl phosphate, p-tolylbis(2,5,5'-trimethylhexyl)phosphate, 2-ethylhexyldiphenyl phosphate and diphenyl hydrogenphosphate. More preferable phosphate is triphenyl phosphate. Triphenyl phosphate may preferably be used with hexabromobenzene. Triphenyl phosphate may also be used with antimony oxide.

Other flame retardant is a compound having phosphorus-nitrogen bond such as phosphorus nitride chloride, phosphorus ester amide, phosphoric acid amide, phosphinic acid amide, tris(aziridinyl)phosphine oxide, or tetrakis(oxymethyl) phosphonium chloride.

The present invention is explained referring to examples but these are only examples and do not restrict the present invention thereto.

EXAMPLES 1-2 AND COMPARISON EXAMPLES 1-3

Polyphenylene oxide ($[\eta]=0.55$, in $CHCl_3$, 25° C.) obtained by oxidation polycondensation of 2,6-xylenol and ethylene/ethyl acrylate/maleic anhydride copolymer (65/30/5 by weight, MI=20 g/10 min.) were melt kneaded in a laboplast mill (manufactured by Toyo Seiki) with the ratios mentioned in Table 1. Compositions (kneading temperature was about 270° C.) were compression molded to prepare test pieces for Izod impact strength and those for load deformation temperature. Izod impact strength and load deformation temperature were observed according to JIS K 7110 and K 7207, respectively.

For comparison, low density polyethylene ("Sumikasen" F 101-1, prepared by Sumitomo Chemical Company, Limited) was used in place of the ethylene/ethyl acrylate/maleic anhydride and Izod impact strength and load deformation temperature were similarly observed to those as in the examples.

Table 1 shows the results.

As is apparent from Table 1, impact strengths of compositions of polyphenylene oxide and polyethylene in comparison examples are low but those of the present compositions of polyphenylene oxide and ethylene/ethyl acrylate/maleic anhydride are very high and no lowering in load deformation temperature is seen in the latter. This substantiates the fact that compatibility with polyphenylene oxide is good for the present compositon.

EXAMPLES 3-5 AND COMPARISON EXAMPLE 4

Polyphenylene oxide used in Example 1, high impact polystyrene ("Esblight" 500A, manufactured by Nippon Polystyrene Co. Ltd.) and ethylene/ethyl acrylate/maleic anhydride copolymer used in Example 1 were melt kneaded in a laboplast mill as in Example 1 and Izod impact strength was observed.

Table 2 shows composition ratio of respective resins and Izod impact strength.

For comparison, no ethylene/ethyl acrylate/maleic anhydride copolymer was used.

Table 2 shows that increase is observed in impact strength by incorporating a small amount of ethylene/ethyl acrylate/maleic anhydride copolymer in a composition of polyphenylene and rubber modified polystyrene.

EXAMPLES 6-7

Polyphenylene oxide (90 parts by weight) used in Example 1 and ethylene/alkyl ester of $\alpha,\beta$-unsaturated carboxylic acid/maleic anhydride copolymer (10 parts by weight) having composition as in Table 3 were melt kneaded as in Example 1 and Izod impact strength and load deformation temperature were observed. Table 3 shows the results.

As explained above, the present thermoplastic resin composition displays remarkable effects in respect of well-balanced properties of shaped articles as well as good processability.

Novel resin composition provided by the present invention is easily able to shape into articles by shaping processes familiar to usual polyphenylene oxide thermplastic resin, such as injection molding, extrusion molding, etc. to provide articles having good and uniform appearance as well as well-balanced properties in impact resistance, heat resistance and hardness.

TABLE 1

|  | Compounding ratio (parts by weight) | | | Izod impact strength (notched) ($Kg \cdot cm/cm^2$) | Load deformation temperature (18.6 $Kg/cm^2$) (°C.) |
| --- | --- | --- | --- | --- | --- |
|  | Polyphenylene oxide | Ethylene/ethyl acrylate/maleic anhydride copolymer | Low density polyethylene | | |
| Example 1 | 90 | 10 | — | 30.5 | 195 |
| Example 2 | 70 | 30 | — | 12.1 | 150 |
| Comparison example 1 | 100 | — | — | 5.2 | 195 |
| Comparison example 2 | 90 | — | 10 | 3.1 | 185 |
| Comparison example 3 | 70 | — | 30 | 4.1 | 110 |

TABLE 2

|  | Compounding ratio (parts by weight) | | | Izod impact strength (notched) ($Kg \cdot cm/cm^2$) |
| --- | --- | --- | --- | --- |
|  | Polyphenylene oxide | High impact polystyrene | Ethylene/ethyl acrylate/maleic anhydride copolymer | |
| Example 3 | 50 | 50 | 1 | 15.2 |
| Example 4 | 50 | 50 | 3 | 24.6 |
| Example 5 | 50 | 50 | 10 | 18.1 |
| Comparison example 4 | 50 | 50 | — | 9.1 |

TABLE 3

|  | Ethylene copolymer composition (% by weight) | | | MI (g/10 min) | Polyphenylene oxide/ Ethylene copolymer Compounding ratio (parts by weight) | Izod impact strength (notched) ($Kg \cdot cm/cm^2$) | Load deformation temperature (18.6 $Kg/cm^2$) (°C.) |
| --- | --- | --- | --- | --- | --- | --- | --- |
|  | Ethylene | Alkyl ester of $\alpha,\beta$-unsaturated carboxylic acid | Maleic anhydride | | | | |
| Example 6 | 68 | 30 (BA)* | 2 | 8 | 90/10 | 24.2 | 195 |
| Example 7 | 88 | 10 (EA)* | 2 | 3 | 90/10 | 20.4 | 195 |

*BA: n-Butyl acrylate  EA: Ethyl acrylate

We claim:
1. A thermoplastic resin composition comprising:
   (A) polyphenylene oxide resin, and
   (B) ethylene copolymer, consisting essentially of 50-90% by weight of ethylene, 5-49% by weight of an alkyl ester of α,β-unsaturated carbosylic acid and 0.5–10% by weight of maleic anhydride.

2. A thermoplastic resin composition comprising:
(A) polyphenylene oxide resin,
(B) ethylene copolymer, consisting essentially of 50–90% by weight of ethylene, 5–49% by weight of an alkyl ester of α,β-unsaturated carboxylic acid and 0.5–10% by weight of maleic anhydride, and
(C) an alkenyl aromatic resin or an alkenyl aromatic resin and a rubbery polymer.

3. A thermoplastic resin composition according to claim 1 or claim 2 wherein (A) polyphenylene oxide resin is that obtained by oxidation polycondensation of one or two or more of phenols of the formula:

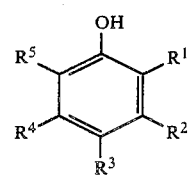

wherein $R^1$, $R^2$, $R^3$, $R^4$ or $R^5$ is any of a hydrogen atom, a halogen atom, a hydrocarbon residue or a substituted hydrocarbon residue and one of them is a hydrogen atom.

* * * * *